United States Patent [19]

Poorman

[11] Patent Number: 5,051,965
[45] Date of Patent: Sep. 24, 1991

[54] ACOUSTO-OPTICAL MARINE SENSOR ARRAY

[75] Inventor: Thomas J. Poorman, Houston, Tex.

[73] Assignee: Western Atlas International, Inc., Houston, Tex.

[21] Appl. No.: 724,884

[22] Filed: Apr. 19, 1985

[51] Int. Cl.[5] .............................................. H04R 1/02
[52] U.S. Cl. ..................................... 367/149; 367/79; 359/135; 385/13; 385/42
[58] Field of Search ................... 367/78, 79, 140, 141, 367/149, 153, 154; 73/657; 350/96.29, 96.30; 356/345, 357, 358, 363; 370/1, 4

[56] References Cited

U.S. PATENT DOCUMENTS

| | | | |
|---|---|---|---|
| 3,721,954 | 3/1973 | Fontanel et al. | 367/48 |
| 4,302,835 | 11/1981 | McMahon | 367/79 |
| 4,311,391 | 1/1982 | Gilmour | 367/149 |
| 4,319,186 | 3/1982 | Kingsley | 367/140 |
| 4,320,475 | 3/1982 | Leclerc et al. | 367/149 |
| 4,375,680 | 3/1983 | Cahill et al. | 367/149 |
| 4,436,425 | 3/1984 | Cole | 367/149 |
| 4,486,657 | 12/1984 | Bush | 367/149 |
| 4,547,869 | 10/1985 | Savit | 367/149 |
| 4,589,285 | 5/1986 | Savit | 367/149 |

OTHER PUBLICATIONS

Danbridge et al., Phase Compensation in Interferometric Fiber-Optic Sensors, Naval Research Lab., Washington, D.C., Jun. 1982, vol. 7, #6, pp. 279-281.

Primary Examiner—Brian S. Steinberger
Attorney, Agent, or Firm—William A. Knox

[57] ABSTRACT

An acousto-optical seismic sensor array includes a distributed set of optical-fiber sensing coils. A light pulse is launched through the sensing coils in serial order. The light pulse is cumulatively data-modulated by the respective sensing coils and is returned as a time-division multiplexed pulse train. The pulse train is split into a first pulse train and a retarded second pulse train. The retardation time equals the travel-time delay of a light pulse between sensors. The retarded pulse train is compared with the first pulse train to determine the phase shift therebetween for consecutive pulses. The phase shift is an analog of the quantity being sensed.

12 Claims, 2 Drawing Sheets

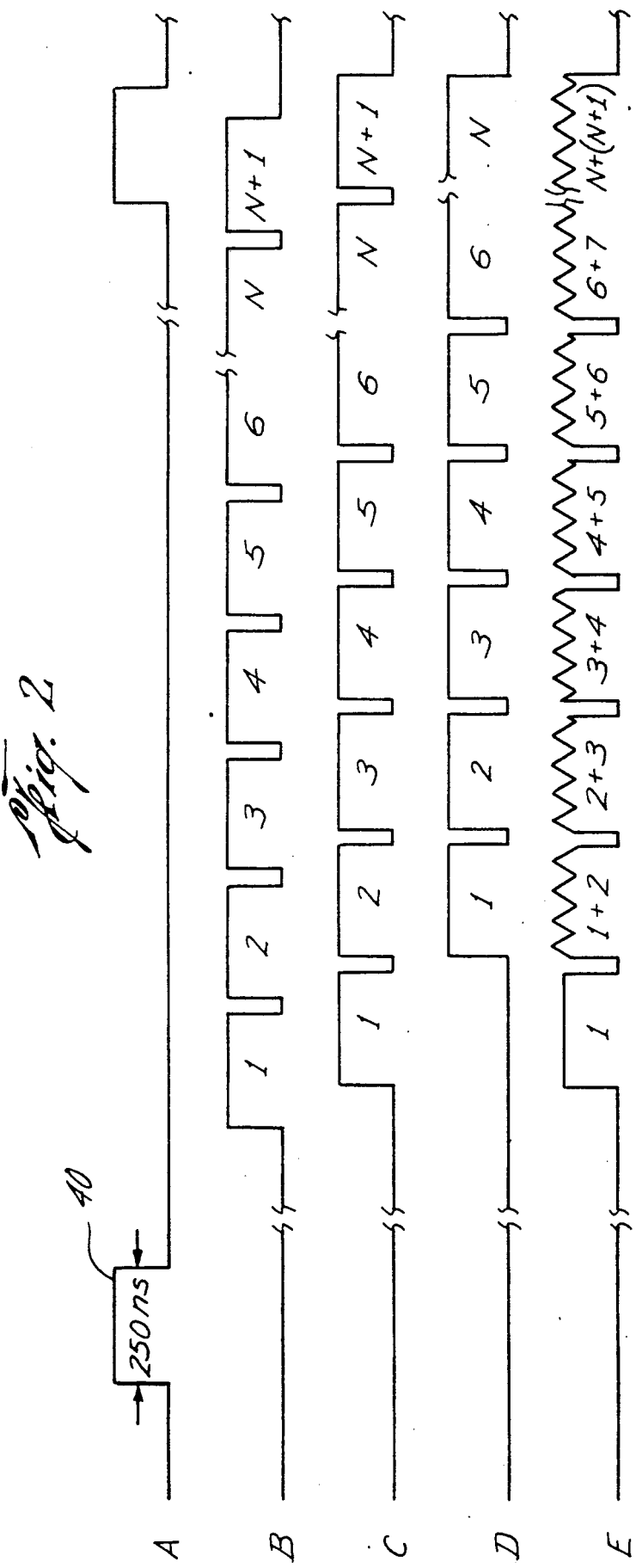

ACOUSTO-OPTICAL MARINE SENSOR ARRAY

BACKGROUND OF THE INVENTION

1. Field of the Invention

This invention is concerned with an acousto-optical seismic sensor array for use in a seismic marine streamer cable as used for seismic exploration.

2. Discussion of the Prior Art

In marine seismic exploration, a long streamer cable, containing many hundred pressure sensors or hydrophones, is towed through the water at an assigned depth. At intervals, as a towing ship steams along a line of survey, a sound source emits an acoustic signal or shot. The resulting acoustic waves propagate downward through the sub-bottom earth layers whence they are reflected back to the water surface. The reflected waves are sensed by the hydrophones as water-pressure variations which are converted to analog electrical signals. The signals from the hydrophones are transmitted by wire lines or coaxial cables to the towing ship for use by a signal utilization device. As a matter of interest, the seismic signals have a wide dynamic range of at least 120 dB. The overall sensitivity of the pressure sensors and the ancillary signal processing system is therefore an important consideration.

Conventional electrical data-gathering systems in current use are often of a telemetric design where one or two broad-band transmission lines link the hydrophones to the shipboard data-processing equipment. Each subgroup of hydrophones (of which there may be 50 or more) requires electrically active multiplexers and repeaters. Thus, not only signal transmission lines but also electrical power lines are required to be included in the streamer cable. Being electrical in nature, signals from one sensor channel are subject to crossfeed into some other channel due to electrical leakage. Generally the pressure sensors in common use are piezoelectric crystals which produce a very small signal and are characterized by a very high impedance. Impedance-matching networks are required for each sensor or group of sensors.

Optical-fiber technology has been investigated to replace the traditional hard-wired/electrical technology presently in use for seismic streamer cables. Optical components are hardened against cross-fed electrical transients and may be passive systems.

It is well known that changes in ambient pressure cause changes in length and index of refraction of an optical fiber. Such environmental changes will cause changes in the intensity, phase, and polarization of a light pulse propagating through the fiber. The incremental change in the light-pulse characteristics per unit of fiber length is small. Accordingly the sensor portion of an acousto-optical data acquisition system usually consists of a small coil of optical fiber wound around a mandrel. The coil is then exposed to the medium whose physical parameters are to be measured.

Typically, the sensing fiber or coil is used in conjunction with a reference fiber mounted in a controlled environment. A laser-launched light beam is transmitted in parallel through both the sensor fiber and the reference fiber. The relative difference in intensity, phase shift or polarization angle of the output light is a direct function of the quantity being measured.

Most acousto-optical devices employ a pair of photo diodes, with or without an interferometer, as a light-beam comparator device. In a laboratory environment, the comparator device as well as the reference fiber, which are relatively delicate, remain under controlled conditions while the sensor itself is used as a probe mounted on the end of a suitable optical-fiber cable for limited excursions to remote locations. For seismic operations, such a relatively simple configuration is not possible.

A seismic streamer cable for marine use is a distributed-sensor data-acquisition system. Several hundred sensors are employed over several kilometers. In some suggested optical systems, the reference fiber and comparator device such as an interferometer are co-located with the sensor itself. Data are returned to a processing system on board the ship either by a multiple-fiber cable or over a single-fiber time-division or wavelength-division multiplexing system. The disadvantage here is the need for active devices in the seismic cable with consequent power-supply complications. Additionally, the reference fibers and comparators are subjected to an undesirable hostile environment.

Alternate arrangements have been suggested for use with a passive acousto-optical system. The system requires two optical fibers, one for feeding laser pulses to a plurality of optical-fiber sensors and one for returning the acoustic-signal-modulated light beam to the towing ship. The inputs of the plurality of optical-fiber sensors are coupled in parallel to the feed line by suitable well-known directional optical couplers. The outputs of the sensors are similarly coupled in parallel to the return line. A single absolute-reference fiber is coupled between the feed line and the return line in conjunction with a light-comparator device. As a laser pulse propagates through the feed line, a portion of the light is tapped off to each of the respective sensors. The tapped-off light pulse then returns to the absolute-reference/comparator network as a stream of pulses in time-division-multiplexed format. Of course, the original pulse is also transmitted by the laser to the absolute reference/comparator network through a tapped optical delay line. The tapped delay line is required to compensate for the increasing distances of the sensors from the ship and the consequent pulse-time delays.

There are many disadvantages in the above system. There are several hundred sensors, each of which requires two optical couplers per sensor. Commercially-available couplers cost several hundred dollars each so that such a system is costly. The tapped delay line requires as many taps as there are sensors as well as some form of active multiplexer to synchronize the delayed reference pulse with the returning data-signal-modulated pulses. Furthermore cumulative errors in the physical dimensions of 3- or 4-Kilometer streamer cables would make it difficult to provide an accurately-tapped delay line.

It is an object of this invention to provide an economical, simple acousto-optical system having a minimal number of components, for use in seismic exploration.

SUMMARY OF THE INVENTION

In accordance with a preferred aspect of this invention first and second elongated optical fibers and a plurality of directional optical couplers are provided. A number of separated portions of the first optical fiber are wound around mandrels to form multi-turn pressure-sensing coils. At points intermediate the respective sensor coils, the first fiber is coupled to the second fiber by a directional optical coupler. A laser launches a substantially monochromatic light pulse into one end of the first optical fiber. The light pulse passes through a pressure-sensing coil where it is data-modulated. A portion of the data-modulated pulse energy is tapped off at the corresponding directional optical coupler to be transmitted back to one end of the second optical fiber. The pulse then continues on to the next-in-line pressure sensing coil. A demodulator is coupled to one end of the second optical fiber for measuring the relative phase shift between a radiation pulse that is received after having propagated through any one pressure-sensing coil and the same radiation pulse that was received after having propagated through an immediately preceding pressure-sensing coil.

Preferably, a beam splitter is coupled between the one end of the second optical fiber and the demodulator for transmitting radiation pulses, received from one end of the second fiber, along first and second optical branches. A delay line is coupled in series with the first optical branch for retarding a radiation pulse by an amount equal to the pulse propagation delay time between any two pressure-sensing coils. A pulse propagating through the second optical branch remains substantially undelayed so that a delayed radiation pulse that propagated through a first pressure-sensing coil arrives at the demodulator in coincidence with an undelayed radiation pulse that propagated through a second, adjacent pressure-sensing coil.

Preferably the directional optical couplers are 2×2 couplers having a coupling ratio less than 0.1% and the radiation source is a laser that has a coherence length greater than 1 meter.

BRIEF DESCRIPTION OF THE DRAWINGS

A better understanding of the benefits and advantages of my invention may be obtained from the appended detailed description and the drawings, wherein:

FIG. 2 is a timing diagram of the data-pulse sequences.

DETAILED DESCRIPTION OF THE PREFERRED EMBODIMENT

Figure 1:
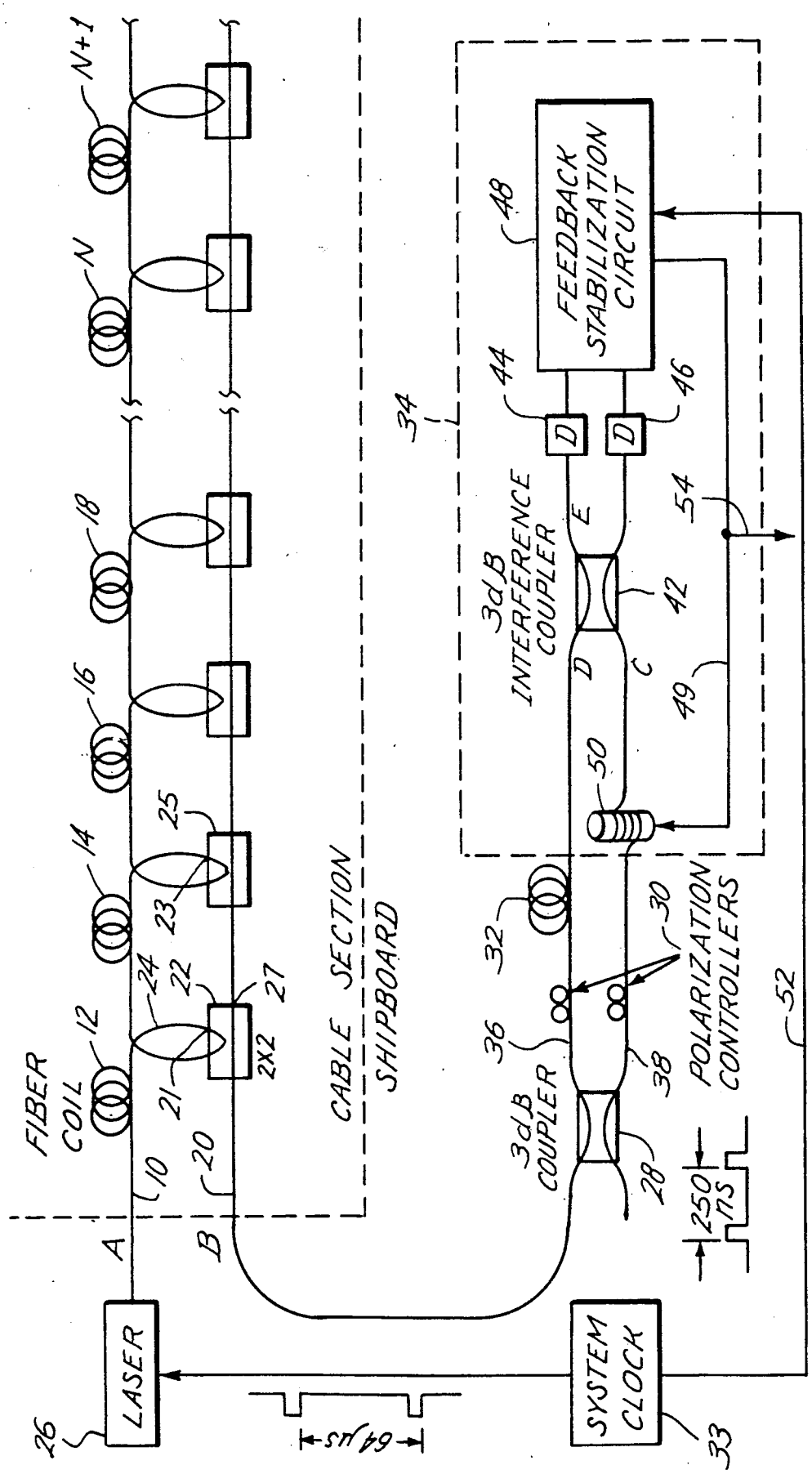
FIG. 1 is a schematic diagram of the optical seismic sensor array of this invention.

FIG. 1 is a schematic view of the essential components of an acousto-optical seismic sensor array. The array consists of first elongated optical input fiber 10 which is preferably single mode. At a plurality of separated portions of the fiber 10, the fiber is wound into multi-turn coils 12, 14, 16, 18, . . . N, N+1, where N typically may be 256. The separation between the coils is preferably 12.5 meters (m). Each coil consists of many turns of the first optical fiber having a cumulative length of 25 m per coil with a tolerance of ±10 centimeters (cm). The optical-fiber coils may conveniently be wound around a suitable compliant mandrel (not shown). The respective coils constitute pressure-sensing coils. The total length of the array may be on the order of 3.2 kilometers(km) or more.

A second elongated optical return fiber 20 is provided parallel to the first optical fiber 10. The second fiber 20 is also preferably single mode. At intervals intermediate the pressure-sensing coils, the first optical fiber 10 is coupled to the second optical fiber 20 by means of 2×2 evanescent directional couplers such as 22. There are as many couplers as there are sensing coils. The term 2×2 refers to the fact that the couplers have two input lines and two output lines. The coupling ratio is much less than 0.1% and preferably is 0.01%. That is, if a light pulse is propagating through optical fiber 10, 0.01% of the light energy will be coupled into optical fiber 20 at the output of each sensing coil. The coupled light energy is returned by the second fiber to demodulator 34 to be later described. It is to be observed that optical fiber 10 must be coupled into each coupler through a reverse-turn loop such as 24 because the couplers are directional. The total path length between any two sensing coils as measured along first fiber 10 from the input 21 at coupler 22, to input point 23 of coupler 25, and back along second fiber 20 at input point 27 of coupler 22, is 50 m. That distance may be termed the path-length mismatch. Optical couplers of the type described are commercially available from Litton Guidance and Control Systems, Inc., of Canoga Park, Calif., from Gould Defense Electronics of Glenbernie, Md. and from others as well.

The components above described are preferably mounted in a seismic streamer cable of any conventional, well-known design, as indicated by the dotted-line box. Aboard the towing ship are located a source of radiation 26, a 3-dB optical coupler 28, polarization controlling devices 30, a delay line 32, a system clock 33 and a demodulator 34 which latter is shown enclosed by the dashed lines.

Radiation source 26 launches a pulse of radiation into one end of first optical fiber 10 at desired sample intervals such as 64 $\mu$s as controlled by system clock 33. The pulse width is preferably 250 nanoseconds(ns). Source 22 may be a laser that radiates energy in the near infrared portion of the spectrum having a wavelength on the order of 1.3 micrometers ($\mu$m). The coherence length of the laser should be greater than 1 m.

The pulse, launched into one end of first optical fiber 10, propagates to the right, passing through each of the pressure sensing coils that are coupled together in series. At each sensor or sensing coil, the radiation pulse is modulated by the ambient pressure field due to seismic waves. A portion of the modulated pulse from each sensing coil is tapped off by the 2×2 directional optical couplers and the tapped-off pulse portion is returned through second optical fiber 20 to the shipboard processing equipment next to be described. The 250 ns pulse width is related to the 50 m path-length mismatch between consecutive sensing coils, assuming a pulse-propagation velocity of 5 ns/m.

To one end of second optical fiber 20, there is coupled a 3-dB coupler 28. The function of coupler 28 is to divide the arriving modulated radiation-pulse energy equally along first and second optical branches or pathways 36 and 38. Conventional polarization controlling devices 30 are coupled into both branches as required. First optical branch 36 includes a delay line 32 that has a path-length mismatch that is exactly equal to the path-length mismatch between the consecutive sensing coils. The purpose of delay line 32 is to retard a received, data-modulated radiation pulse by a time delay equal to the pulse propagation delay between pressure-sensing coils such as 12 and 14. No added delay is introduced in second optical branch 38.

Referring now to FIGS. 1 and 2A, laser 26 launches a radiation pulse 40 into one end of first optical fiber 10 at point A as shown in FIG. 2A. As pulse 40 propagates through the respective sensing coils in series arrangement, a portion of the pulse is tapped off at the corresponding couplers, returning to one end B, of second optical fiber 20 as a train of time-division-multiplexed radiation pulses 1-6, ... N, N+1 as shown in FIG. 2B. The received pulse train is divided equally between first and second optical branches 36 and 38 by 3-dB coupler 28. Delay line 32 retards the pulse train in first optical branch 36 with respect to the pulse train propagating in second optical branch 38, by one full pulse width as shown in FIGS. 2D and 2C. Thus, pulse 1, FIG. 2D, as data-modulated by sensing coil 12, becomes coincident with pulse 2, FIG. 2C, as data-modulated by both sensing coils 12 and 14. The pulse trains of FIGS. 2D and 2C now become inputs to demodulator 34.

It should be understood that data-modulation of pulse 40 is cumulative as the pulse propagates through the array of pressure-sensing coils. That is, when pulse 40 enters sensing coil 14, it has already been data-modulated by pressure-sensing coil 12. Similarly the pulse entering sensing coil 16 has been data-modulated by pressure-sensing coils 12 and 14. Thus each sensing coil acts as both a reference and as a data-signal sensor. It will be understood therefore that I have produced a first set of cumulative values and a second set of the same cumulative values and have delayed the second set relative to the first set.

Demodulator 34 consists of a 3-dB interference coupler 42, photo diodes 44 and 46, feedback stabilization network 48 and PZT quadrature modulator 50. In operation, the data modulated pulses from first and second optical branches 36 and 38 become input signals to lines D and C of 3-dB interference coupler 42. When radiation pulse 1, FIG. 2D is combined with radiation pulse 2, FIG. 2C in interference coupler 42, an interference pattern, as symbolized in FIG. 2E, results; photo diodes 44 and 46 will be unequally illuminated. Feedback stabilization network 48 then sends a driving signal to a conventional PZT quadrature modulator 50 which operates to continuously maintain the phase relationship between a radiation pulse propagating in second optical branch 38 and a pulse propagating through first optical branch 36 in quadrature, that is, at a 90° relative phase shift. At that point, photo diodes are equally illuminated. The signal level applied by feedback stabilization network over line 49 to PZT quadrature modulator 50 is a direct measure of the relative phase shift between a radiation pulse that is data-modulated by a given pressure-sensing coil such as 14 and a radiation pulse that is data modulated by an immediately preceding neighboring pressure-sensing coil such as 12 as referenced from one end such as A of first optical fiber 10. In turn the relative phase shift between the two pulses is a direct function of the parameter under measurement such as the relative pressure difference between two sensing coils. The signal level existing on line 49 is therefore an electrical analog of the measured relative pressure difference between any two pressure-sensing coils. Because the radiation pulse is cumulatively data-modulated at each of the respective pressure-sensing coils, the relative pressure difference is the actual pressure at the second of two sensing coils. The signal level on line 49 may be sent to a signal utilization device over line 54 for archival storage and further processing. The details of demodulator 34 are well known and per se form no part of this invention although the demodulator taken as a whole is a necessary component for implementing this invention. Accordingly, I have compared the first set of cumulative values with the delayed second set of cumulative values to produce values of a physical quantity, such as pressure, corresponding to individual ones of a plurality of distributed locations.

From FIG. 2E, it will be understood that the undelayed data-modulated radiation pulse arriving from the first sensing coil 12 does not interfere with any other pulse since there is no preceding neighboring pressure-sensing coil. That is, the first pulse is not an interference term. The first interference term is the superposition of the pulses from sensing coils 1 and 2. It is for that reason that, for an array of N operational sensing coils, N+1 sensing coils are required.

Feedback stabilization circuit 48 includes a phase-locked loop arrangement including PZT quadrature modulator. A portion of the duration of the 250 -ns radiation pulse is needed for the circuitry to lock-on. Further, the circuit must be reset before the beginning of a next data-modulated radiation pulse is received. Hence a terminal portion of the pulse-duration time is needed for reset. The actual data-sampling time is therefore on the order of 50 to 100 ns. Pulse lock-on and reset are controlled by clock 33 over line 52 to suitable well-known circuitry in feedback stabilization network 48.

In summary, my inventive seismic sensor array has the advantage that the required number of directional optical couplers are reduced by at least one-half. No separate absolute reference fiber is required because I am employing relative measurements between sensors rather than measurements relative to an absolute standard. Tapped delay lines are not needed. The system is a passive system and therefore inherently uncomplicated. The demodulator network is simple and straightforward and can be assembled from conventional, commercially-available components. No interference between pulses can occur anywhere in the system except at interferometer 42 in the demodulator.

So far, this invention has been described in terms of a single radiation pulse launched through a series of optical pressure sensors to produce a single sample of data from each sensor. In actual practice, the seismic sensor array is repeatedly sampled over several seconds. The maximum sample rate may be as fast as 15K samples per second at a sample interval of 64 μs. However from a practical standpoint the sample rate is limited by the capability of the ancillary data-processing equipment to handle the volume of incoming data samples. A secondary consideration is the desired sampling resolution of the seismic signals. The most useful portion of the seismic spectrum covers a band of several tens of hertz (Hz). For a 20-Hz signal, a sampling interval of 12.5 ms would be quite adequate. On the other hand for certain sonar applications a rate of 10K or more samples per second would be beneficial.

For illustrative purposes, my invention has been described with a certain degree of specificity. Variations will occur to those skilled in the art but which may be included within the scope and spirit of this invention which is limited only by the appended claims. For example, the 3-dB interference coupler 42 could be replaced by a well-known 3-dB 3×3 interference coupler. Second optical fiber 20 could be multimode instead of single mode. Any physical property such as temperature could be sensed by the sensing coils. alternatively, instead of coils, and depending on the sensitivities, distances and timing and other physical constraints, straight lengths of fiber or other geometries such as zig-zags, with or without mandrels or the equivalent, may be substituted for the coils.

I cliam as my invention:

1. An acousto-optical seismic sensor array, comprising:

first and second elongated optical fibers;

a plurality of directional optical couplers;

a plurality of separated portions of said first optical fiber being wound as multi-turn pressure-sensing coils;

said first optical fiber being coupled to said second optical fiber by said directional optical couplers at a plurality of points along said first optical fiber, the points being intermediate said separated pressure-sensing coils;

a source means for launching a substantially monochromatic radiation pulse into one end of said first optical fiber;

a beam splitter coupled to said second optical fiber for equally dividing radiation pulses between first and second optical branches of said second optical fiber;

a delay line coupled into said first optical branch to retard in time a radiation pulse propagating along said first optical branch by an amount equal to the radiation-pulse propagation delay time between any two consecutive pressure-sensing coils; and demodulator means coupled to said first and second branches of said second optical fiber for measuring the relative phase shift between a received radiation pulse that propagated through any one pressure-sensing coil and the same radiation pulse received after having propagated through the immediately preceding pressure-sensing coil;

said beam splitter and said delay line being located between said plurality of directional optical couplers and said demodulator means.

2. The apparatus of claim 1 wherein said first and second elongated optical fibers are evanescently coupled by said plurality of directional optical couplers.

3. The seismic sensor array as defined by claim 1, further comprising:

means in said demodulator for measuring the phase difference between a retarded radiation pulse propagating through said first optical branch and an unretarded pulse propagating through second optical branches as an analog of the pressure differences sensed by said pressure-sensing coils.

4. The seismic sensor array as defined by claim 1, wherein the coupling ratio of said 2×2 optical directional couplers is less than 0.1%.

5. The seismic sensor array as defined by claim 1, wherein said monochromatic source of radiation is a laser having a coherence length greater than a preselected lower limit and is characterized by emitting radiation having a wavelength in the near infra red region of the radiation spectrum.

6. The seismic sensor array as defined by claim 1, wherein the time delay imparted by said delay line is proportional to the path-length mismatch between any two pressure sensing coils.

7. An acousto-optical seismic sensor array comprising:

a first elongated input optical fiber;

a second elongated return optical fiber;

a plurality of separated multi-turn pressure-sensing coils wound from portions of said first elongated optical fiber;

a plurality of directional optical couplers, said first elongated input optical fiber being coupled by said directional optical couplers to said second elongated return fiber at points intermediate the separated pressure-sensing coils;

a source of radiation for launching a radiation pulse into one end of said first elongated optical input fiber at timed intervals;

means in said second elongated optical return fiber for retarding at least a portion of the radiation pulses from the respective pressure-sensing coils; and means coupled to one end of said second elongated optical return fiber for receiving and demodulating data modulated time-division-multiplexed radiation pulses from the respective pressure-sensing coils.

8. The acousto-optical seismic sensor array as defined by claim 7, comprising:

means for superposing any two successive time-division-multiplexed radiation pulses thereby to measure the relative phase shift therebetween.

9. The acousto-optical seismic sensor array as defined by claim 8, comprising:

means for deriving an analog of the pressure difference between any two consecutive pressure-sensing coils as a function of the measured phase shift.

10. The apparatus of claim 7 wherein said plurality of directional optical couplers are evanescent couplers.

11. An optical-fiber multi-sensor, telemetric system comprising:

a radiation-pulse source coupled into a first optical fiber, a plurality of pressure sensor elements serially coupled along said first optical fiber, a second optical fiber, a plurality of optical couplers between said first and second optical fibers, means for receiving a radiation pulse from said second fiber and for diverting said pulse into two pathways, one of said pathways including a pulse-retarding means, and a demodulator for comparing phase characteristics of radiation pulses passing through said two pathways.

12. The method of detecting pressure waves at successive multiple locations in an aquatic environment comprising:

locating first and second elongated optical fibers in said environment in a region where detection of said pressure waves is desired;

forming a plurality of sensign ocils in said first optical fiber at equally spaced intervals;

coupling said first and second optical fibers by means of a plurality of directional optical couplers located intermediate each of said sensing coils;

providing coherent light pulses in said first optical fiber at timed intervals, a portion of said light pulses being coupled into said second optical fiber by each of said directional optical couplers, the phase of said coupled light pulses in said second optical fiber having been modulated by pressure changes present at said sensing coils;

dividing said second optical fiber into two optical branches and retarding the modulated light pulses present in said second optical fiber in one of said branches;

receiving the modulated light pulses in said two optical branches in a demodulator and demodulating said light pulses to obtain signals representative of pressure changes in said plurality of sensing coils.

* * * * *